United States Patent [19]

Hutchisson

[11] Patent Number: 5,325,271
[45] Date of Patent: Jun. 28, 1994

[54] MARKER LAMP WITH LED ARRAY AND PRISMATIC DIFFUSER

[75] Inventor: James T. Hutchisson, Bellevue, Wash.

[73] Assignee: Dominion Automotive Industries Corp., Kent, Wash.

[21] Appl. No.: 896,178

[22] Filed: Jun. 10, 1992

[51] Int. Cl.5 .......................... F21V 8/00; H01J 33/02
[52] U.S. Cl. ......................... 362/32; 313/500; 313/116; 362/61
[58] Field of Search ............... 313/500, 116, 512; 362/32, 61, 80, 83.3, 240, 800; 220/2.1 R; D26/35

[56] References Cited

U.S. PATENT DOCUMENTS

| | | | |
|---|---|---|---|
| 3,582,604 | 6/1971 | Ellard | 240/8.2 |
| 4,298,869 | 11/1981 | Okuno | 340/782 |
| 4,733,335 | 3/1988 | Serizawa et al. | 362/800 |
| 4,804,991 | 2/1989 | Ishizuki et al. | 354/403 |
| 4,912,606 | 3/1990 | Yamamoto | 362/61 |
| 4,935,665 | 6/1990 | Murata | 313/500 |
| 4,935,856 | 6/1990 | Dragoon | 362/307 |
| 4,947,293 | 8/1990 | Johnson et al. | 362/32 |
| 4,951,179 | 8/1990 | Machida | 362/61 |
| 5,001,609 | 3/1991 | Gardner et al. | 362/32 |
| 5,101,326 | 3/1992 | Roney | 362/61 |
| 5,193,895 | 3/1993 | Naruke et al. | 362/800 |

Primary Examiner—Sandra L. O'Shea
Assistant Examiner—Vip Patel
Attorney, Agent, or Firm—Christensen, O'Connor, Johnson & Kindness

[57] ABSTRACT

A lamp assembly (10) for use as a vehicle marker lamp or a vehicle clearance lamp is disclosed. A lamp assembly includes a multifaceted prismatic diffuser (12) to which a number of LEDs (14) are fitted. The diffuser has an outwardly directed portion (20), a center portion (22), and an inwardly directed portion (24). The outwardly directed portion and inwardly directed portion are both formed with angularly offset facets (26-38). The LEDs are fitted into openings (40) that are formed in the facets (32, 34) of the inwardly directed portion of the diffuser. When the LEDs are energized, the light emitted thereby is initially diffused throughout all of the diffuser. It is then emitted from the facets forming the outer portion of the diffuser such that it can be seen over a wide viewing angle.

15 Claims, 3 Drawing Sheets

MARKER LAMP WITH LED ARRAY AND PRISMATIC DIFFUSER

FIELD OF THE INVENTION

This invention relates generally to lamp assemblies and, more particularly, to a marker lamp constructed of light-emitting diodes.

BACKGROUND OF THE INVENTION

Marker lamps are frequently fitted to the outside of large vehicles, such as trucks, trailers, and recreational vehicles. Marker lamps are installed on a vehicle to provide an indication of its size, shape, and direction of motion so that nearby motorists and pedestrians can quickly evaluate the characteristics of the vehicle and take necessary steps to avoid an accident. Some vehicles, such as large trailers, are provided with a set of top located marker lights, known as clearance lights. Clearance lights are mounted on a vehicle in order to provide a ready indication of whether or not the vehicle can drive under a low ceiling structure, such as a bridge or a loading dock canopy. A typical marker lamp assembly comprises an incandescent light bulb that is encased inside a small housing. A colored lens, typically an amber lens, forms the outer wall of the housing. The amber wavelength light emitted by the bulb passes through and is diffused by the lens. This light is the light nearby motorists and pedestrians observe when they see an illuminated marker light.

While conventional bulb-in-housing marker lamps have proved useful for providing an indication of the shape of the vehicle to which they are attached, they are not without some limitations. The trucks, trailers, and other vehicles to which these lamps are mounted often experience intense vibrations and/or vibrate constantly while in motion. The bulbs in these lamp assemblies contain thin, fragile filaments. Over time, the vibrations to which these bulbs are exposed cause the filaments to break, resulting in burnout of the bulb. Since many marker lamps are located on the top of the vehicle to which they are attached, and can be 10 or more feet off the ground, removing and replacing the burned-out bulbs can be a laborious and time-consuming task. Another disadvantage of these assemblies is that in some environments the ambient light may be so intense that it washes out the light emitted by a marker light. This can make it difficult on a bright, sunny day, for example, to use the marker lights to evaluate whether there is sufficient clearance for a truck trailer to pass under a bridge or through a tunnel.

Moreover, the housing forming the body of a marker lamp is simply a hollow body. The outer wall of this body is a thin plastic layer that has relatively minimal mechanical strength. Consequently, the lenses of this assembly are prone to breakage when struck by foreign objects, such as rocks that may be thrown up from the road by the wheels of the vehicle or deliberately thrown by mischievous persons. Once an object breaks the lens, the lamp assembly may no longer emit the appropriate color light and confuse nearby persons who expect the light to have certain characteristics. Also, if the object strikes the marker/clearance light hard enough it will break not only the lens but the bulb inside the lamp housing. Once this happens, the lamp assembly is rendered completely useless.

Recently, there have been some attempts to use light-emitting diode (LED) lamp assemblies to substitute for conventional incandescent bulb-type marker lamps. A disadvantage of these assemblies is that a single LED does not emit light over a relatively wide arc. In order to provide an LED marker lamp assembly capable of emitting light over a wide viewing field, it has been necessary to construct these assemblies using a number of spaced-apart LEDs. These assemblies are typically too large to put in a vehicle body opening that are normally formed to accommodate marker lights. Moreover, the large number of LEDs that form a single lamp assembly collectively typically consume a relatively large amount of power.

SUMMARY OF THE INVENTION

This invention relates to a lamp assembly that is well suited for use as a vehicle marker lamp or a vehicle clearance lamp. The lamp assembly of this invention includes a prismatic diffuser that is illuminated by a set of light-emitting diodes (LEDs). The prismatic diffuser of this lamp assembly has a number of inwardly directed facets that are located on the portion of the diffuser that is mounted to the body to which the lamp assembly is attached. The prismatic diffuser also has a set of outwardly directed facets. These facets are the exposed surfaces of the lamp assembly. The LEDs are mounted in the inwardly directed facets, so that there is at least one LED mounted in two separate facets.

When the LEDs of the lamp assembly of this invention are energized, the light emitted thereby is initially diffused throughout the diffuser. The light is then emitted from the assembly through the various outwardly directed diffuser's facets, so that it can readily be seen over a relatively wide viewing area.

The LEDs of the lamp assembly of this invention do not have any fragile filaments or other members that are prone to fracture when exposed to prolonged or extreme mechanical vibration. This makes the lamp assembly well suited for installation on a trailer or other vehicle as a marker light or a clearance light. The prismatic diffuser of this assembly collects ambient light and reflects the light back to the outside environment. Consequently, in bright, sunny environments the light is emitted by this lamp assembly and is not appreciably washed out. Moreover, the prismatic diffuser of this lamp assembly is formed from a solid section of plastic. The diffuser thus has a relatively high degree of mechanical strength that allows it to withstand being struck by rocks and other foreign objects. Still another advantage of the lamp assembly of this invention is that, in comparison to other LED-type lamp assemblies, it requires fewer LEDs to emit light over the same viewing field.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drag%s, wherein.

DETAILED DESCRIPTION OF THE PREFERRED EMBODIMENT

Figure 1:
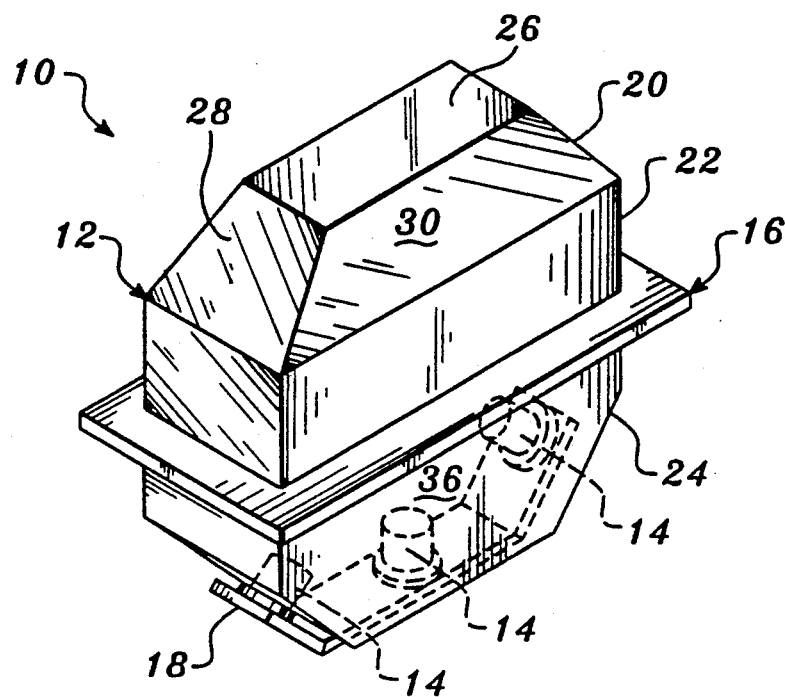
FIG. 1 is a perspective view of the lamp assembly of this invention.
Figure 2:
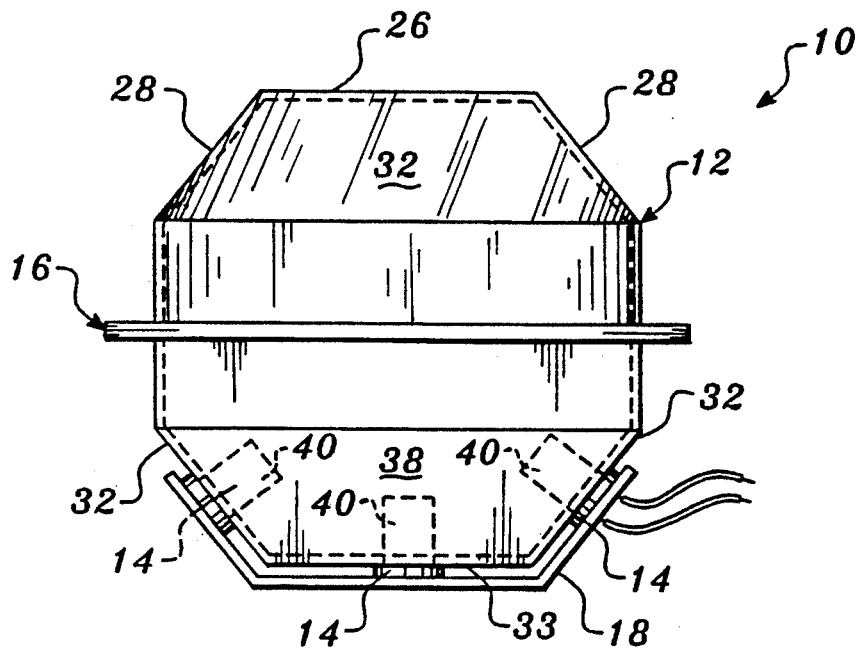
FIG. 2 is a side view of the outwardly directed facets of the lamp assembly of this invention.

FIG. 1 illustrates a lamp assembly 10 of this invention configured for use as a vehicle marker or clearance light. The lamp assembly includes a solid prismatic diffuser 12 to which a set of LEDs 14 is fitted. A collar 16 fitted around the prismatic diffuser 12 serves to secure the lamp assembly 10 to the body to which the assembly is attached. The LEDs 14 are secured to flexible substrate 18. Conductive traces on the substrate 18 (traces not illustrated) supply the energization voltage to the LEDs 14.

The prismatic diffuser 12 is a solid transparent body that may be formed out of either polycarbonate or acrylic plastic. A dye is embedded into the diffuser 12 during its formation so that it is transparent to one particular color of light. For example, an amber-transparent dye is embedded in the diffuser 12 to form a lamp assembly 10 that emits amber wavelength light. The diffuser 12 has three sections, an outwardly directed portion 20, a middle portion 22, and an inwardly directed portion 24. Generally, the diffuser has a rectangular cross-sectional profile. The center section 22 has a length and width that are constant along its depth. The outwardly directed portion 20 is formed with an inwardly directed taper that defines five facets, an outer face facet 26, two side facets 28, an upper facet 30, and a lower facet 32. The side facets 28 have an outward taper of approximately 35° to 65° relative to the outer face facet 26. The upper and lower facets, 30 and 32, respectively, have an outward taper of approximately 60° to 80° relative to the outer face facet 26. The inwardly directed portion 24 of the diffuser 12 forms a rear face facet 33, two side facets 34, and a pair of upper and lower facets 36 and 38, respectively. In one preferred version of the invention the inwardly directed side facets 34 have a taper identical to that of the outwardly directed side facets 28. The upper and lower facets, 36 and 38, respectively, extend perpendicularly from the rear face facet 33 such that they are coplanar with the adjacent walls of the diffuser center section 22.

The LEDs 14 are fitted in openings 40 formed in the diffuser's rearwardly directed section. In the illustrated version of this lamp assembly 10, each inwardly directed side facet 34 and the rear face facet 33 are provided with an opening 40. A suitable LED 14 for use with this assembly 10 is the Sharp LT 9512U manufactured by Sharp Electronics Corporation of Mahwah, N.J. This LED emits 5 candela of light when a current of approximately 36 milliamps is applied thereto. The outer body of this LED has a generally cylindrical shape approximately 9 mm in diameter. The diffuser 12 is formed so that the openings 40 are dimensioned so there is essentially no gap between the LEDs 14 and the diffuser.

Figure 3:
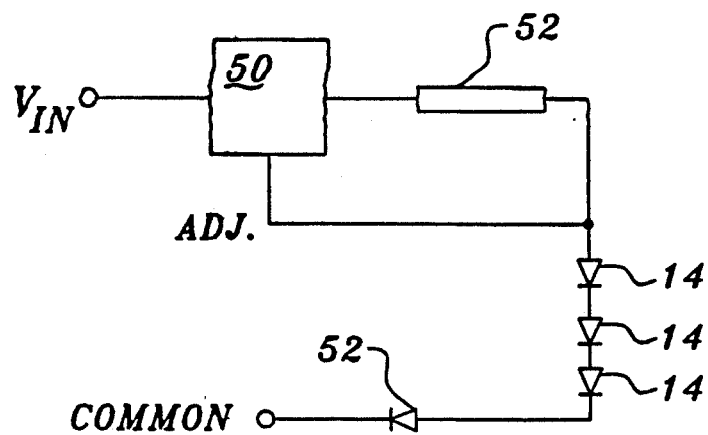
FIG. 3 is a schematic diagram of a power circuit useful for energizing the lamp assembly of this invention.

A circuit for supplying an energization voltage to the lamp assembly 10 is illustrated by FIG. 3. A current regulator 50 such as LM317T manufactured by National Semiconductor Corporation of Santa Clara, Calif. receives a varying voltage between 9 and 36 VDC and produces a constant voltage of approximately 36 milliamps. The current is applied to the LEDs 14 through a load resistor 52 that has a resistance of between 27 and 47 ohms. A diode 54 is connected between the LEDs 14 to prevent the diodes from becoming reverse biased.

The lamp assembly 10 of this invention is activated by applying an energization voltage to the LEDs 14. The application of this voltage to the LEDs 14 causes the light-emitting material to become excited and emit light. This light immediately enters the prismatic diffuser 12 where it is dispersed and reflected internally throughout the body of the diffuser. Owing to the transparency of the diffuser 12, the light is then emitted at its outwardly directed facets 26–32. Since the outwardly directed facets are offset from each other, the light can be observed throughout a relatively wide viewing field. In particular, with respect to the described embodiment of the invention, the light can be viewed at an angle 90° to the right and left of the lamp assembly 10, and within 10° up and down from the lamp assembly. Thus, the light emitted by the lamp assembly draws attention to itself, and to the object to which it is attached over a relatively wide viewing field. This makes the lamp assembly 10 of this invention well suited for installation on vehicles or other objects where regulatory requirements or industry standards require the placement of a light that can be readily seen.

The LEDs 14 of lamp assembly 10 of this invention are formed of relatively resilient material and are able to withstand the prolonged and sometimes intense vibration to which a lamp assembly connected to a vehicle may be exposed. Moreover, since the prismatic diffuser 10 is a solid piece of plastic, it has a relatively high degree of mechanical strength. Therefore, the lamp assembly 10 of this invention is able to withstand being struck by rocks or other foreign objects that can occur when it is placed in a relatively harsh ambient environment, such as when attached to the outside of a truck or the like.

Another feature of the lamp assembly 10 of this invention is that the LEDs 14 will emit light when energization voltages of anywhere between 9 and 36 VDC are applied to the associated current regulator. Consequently, the lamp assembly of this invention continues to operate even if the vehicle power supply with which it is associated malfunctions and emits either an excessively low or excessively high voltage. A related feature of this lamp assembly 10 is that it can provide a light that is visible over a relatively wide viewing field, yet it requires only a few LEDs 14 and the LEDs themselves draw little power. Thus, the lamp assembly of this invention does not draw significant amounts of power. Consequently, in the event it is necessary to operate lamp assemblies of this invention for extended amounts of time off a battery, such as can happen when it is used to illuminate a disabled truck, they will not rapidly drain the truck's battery.

Figure 4:
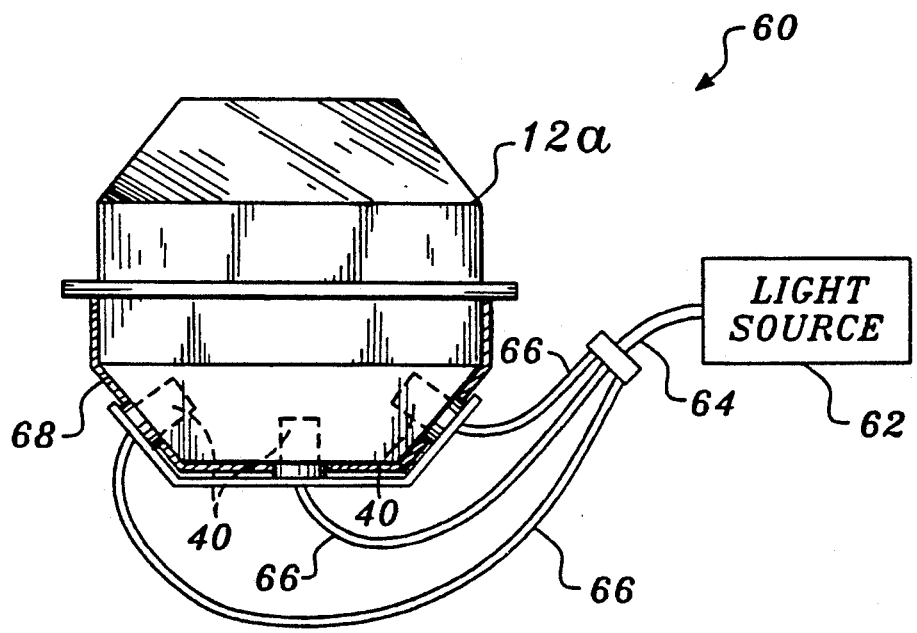
FIG. 4 is a side view of an alternative embodiment of the lamp assembly of this invention.

An alterative lamp assembly 60 of this invention is illustrated by FIG. 4. Lamp assembly 60 has a prismatic diffuser 12a substantially identical to the first described prismatic diffuser 12. The diffuser-illuminating light is supplied to the diffuser from a master light source 62 through a fiber-optic cable 64. The fiber-optic cable is provided with a set of branches 66, each of which is disposed in a separate opening 40 formed in a different one of the inwardly directed facets of the diffuser 12a. A reflective coating 68 is selectively layered over the concealed facets of the diffuser center and inwardly directed portions. An advantage of the lamp assembly of this invention is that the light source 62, such as a halogen lamp or a mercury-vapor bulb, can be used to provide the light needed to illuminate a number of individual diffuser assemblies. This eliminates the need to have to provide each lamp assembly 60 with its own set of LEDs. The reflective coating 68 serves to increase the amount of light that is emitted by the light assembly 60.

Figure 5:
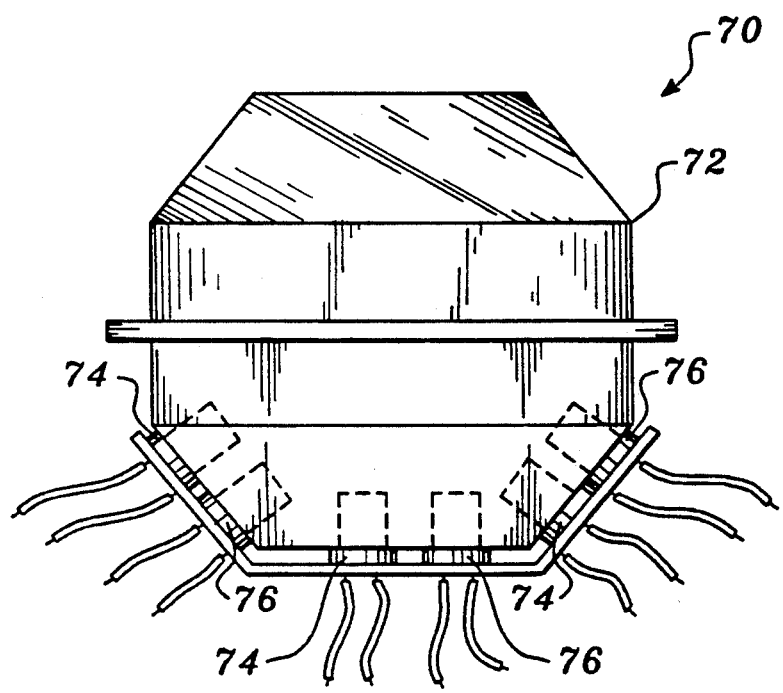
FIG. 5 is a side view of another alterative embodiment of the lamp assembly of this invention.

FIG. 5 illustrates still another lamp assembly 70 of this invention. Lamp assembly 70 includes a prismatic diffuser 72, to which two sets of LEDs, 74 and 76, respectively, are attached. The prismatic diffuser 72 of this lamp assembly 70 is completely transparent; essentially all wavelengths of visible light pass through it. The LEDs 74 and 76 are fitted in the diffuser 72 such that rear face facet 33 and each inwardly directed facet are provided with two LEDs, one from each set. Each set of LEDs 74 and 76 emits a different color of light. For example, one set of LEDs may emit red light while the other set of LEDs emits green light. By the selective actuation of each set of LEDs 74 and 76, lamp assembly 70 can be activated to emit red light, green light, or amber light (a mix of the red and green light). Thus, this lamp assembly can be used to emit different colors of light in order to provide state information about the object with which it is associated, or it can be used to sequentially flash different colors of light in order to direct the observer's attention to the object to which it is attached.

The foregoing detailed description has been limited to a specific embodiment of the invention. It will be apparent, however, that variations and modifications can be made to this invention with the attainment of some or all of the advantages thereof For example, the illustrated and described shape of prismatic diffuser 12 is only one shape of the invention. Other prismatic diffusers may, of course, have different shapes. For example, it may be desirable to provide a version of this invention where the prismatic diffuser has curved facets or a combination of curved and straight facets. Furthermore, it may be desirable to have a multiunit prismatic diffuser wherein, for example, a series of subunits are formed together as a single integral diffuser. In a similar vein, it may be an alterative embodiment of this invention to provide more or fewer LEDs 14 than have been provided in the disclosed embodiment of the invention. Similarly, the LEDs may be mounted in facets of the diffuser other than the rear facet and associated inwardly directed side facets. For instance, it may be desirable in one version of the invention to mount the LEDs in openings formed in the center portion of the prismatic diffuser. Therefore, it is the object of the appended claims to cover all such variations and modifications that come within the true spirit and scope of the invention.

The embodiments of the invention in which an exclusive property or privilege is claimed are defined as follows:

1. A lamp assembly comprising: a prismatic diffuser formed out of a solid section of transparent material, wherein said diffuser is formed with a multiplicity of facets that are angularly offset from each other including at least two said facets that define an outwardly directed section relative to a structure to which said assembly is attached and at least one of said multiplicity of facets other than said outwardly directed facets is formed with an opening; and a light-emitting source disposed in said facet opening.

2. The lamp assembly of claim 1, wherein said diffuser is formed with at least two said facets other than said outwardly directed facets, that are angularly offset from each other and said at least two angularly offset facets are each formed with an opening and a light-emitting source is disposed in each said facet opening.

3. The lamp assembly of claim 2, wherein said facets formed with openings are located adjacent each other.

4. The lamp assembly of claim 1, wherein: said prismatic diffuser is formed with said outwardly directed section, a center section coincident with said outwardly directed section, and an inwardly directed section coincident with said center section located distal from said outwardly directed section, and said inwardly directed section is formed with a face facet and two side facets such that said face facets and said side facets are angularly offset from each other and said side facets and face facets of said inwardly directed portion are each formed with an opening; and a light-emitting source is disposed in each of said openings.

5. The lamp assembly of claim 2, wherein said light-emitting source comprises a set of LEDs.

6. The lamp assembly of claim 4, wherein said light-emitting source comprises a set of LEDs.

7. The lamp assembly of claim 4, wherein said facets have a flat profile.

8. The lamp assembly of claim 4, wherein said outwardly directed portion is further formed with an upper facet and a lower facet such that said upper and lower facets are angularly offset from said side and face facets.

9. The lamp assembly of claim 6, wherein said outwardly directed portion is further formed with an upper facet and a lower facet such that said upper and lower facets are offset from said side and face facets.

10. The lamp assembly of claim 2, wherein said diffuser is formed with at least four said facet openings, one of said light-emitting sources being disposed in each said facet opening, and two of said light-emitting sources emitting light of a first color and two of said light-emitting sources emitting light of a second color different from said first color.

11. The lamp assembly of claim 3, wherein said diffuser is formed with at least four said facet openings, one of said light-emitting sources being disposed in each said facet opening, and two of said light-emitting sources emitting light of a first color and two of said light-emitting sources emitting light of a second color different from said first color.

12. The lamp assembly of claim 2, further including a light-generating unit, and at least one optical transmission cable extending between said light-generating unit and said prismatic diffuser, wherein said at least one optical transmission cable extends into said facet openings to transmit light through said openings into said diffuser.

13. The lamp assembly of claim 12, wherein said at least one cable is provided with a plurality of branches wherein each said branch extends into one of said facet openings.

14. A lamp assembly comprising: a prismatic diffuser having an outwardly directed section formed with at least two facets that are angularly offset from each other and an inwardly directed section distal from said outwardly directed section formed with at least two facets that are angularly offset from each other, wherein said inwardly directed facets are each formed with an opening; and separate LEDs are located in each said facet opening.

15. The lamp assembly of claim 14, wherein said prismatic diffuser is formed with three angularly offset, inwardly directed facets that are contiguous with each other, each said facet is formed with a facet opening, and a separate LED is disposed in each said facet opening.

* * * * *

UNITED STATES PATENT AND TRADEMARK OFFICE
CERTIFICATE OF CORRECTION

PATENT NO. : 5,325,271
DATED : June 28, 1994
INVENTOR(S) : J.T. Hutchisson

It is certified that error appears in the above-indentified patent and that said Letters Patent is hereby corrected as shown below:

| COLUMN | LINE | |
|---|---|---|
| 2 | 60 | "drag%s," should read --drawings,-- |
| 5 | 32 | "thereof For" should read --thereof. For-- |

Signed and Sealed this

Fourth Day of October, 1994

Attest:

BRUCE LEHMAN

Attesting Officer     Commissioner of Patents and Trademarks